June 20, 1961 H. B. MILLER 2,989,725
ELECTROACOUSTIC TRANSDUCER
Filed June 30, 1953
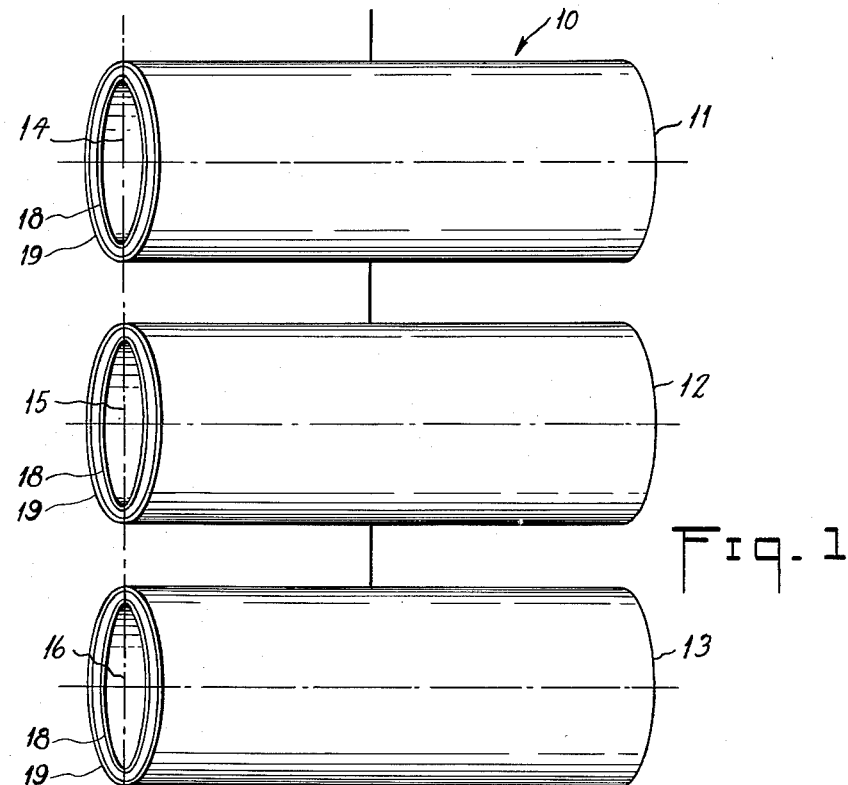
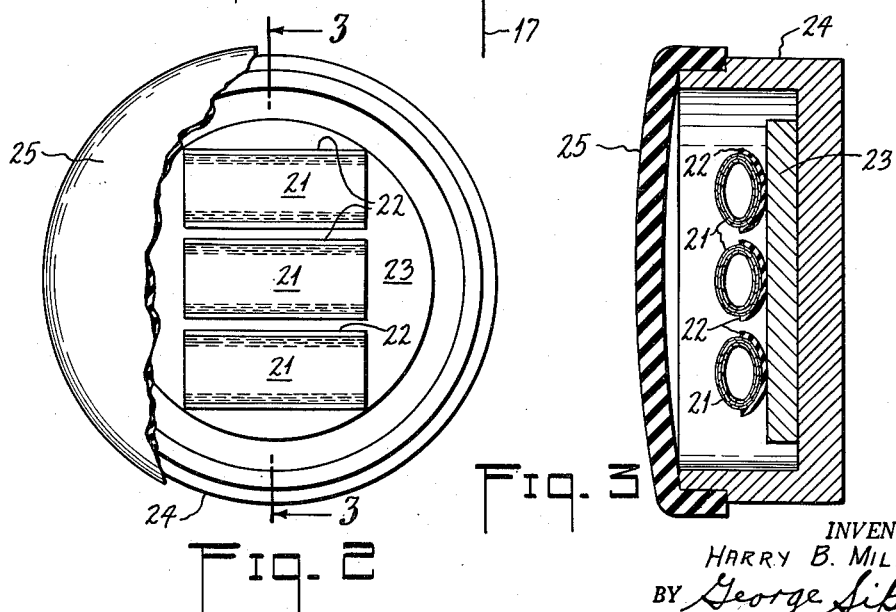
INVENTOR.
HARRY B. MILLER
BY George Sipkin
Lee J. Huntzberger
ATTORNEYS … # 2,989,725
ELECTROACOUSTIC TRANSDUCER
Harry B. Miller, Cleveland Heights, Ohio, assignor, by mesne assignments, to the United States of America as represented by the Secretary of the Navy
Filed June 30, 1953, Ser. No. 365,165
7 Claims. (Cl. 340—9)

This application is a continuation-in-part of abandoned application Serial Number 349,121, filed April 16, 1953, by Harry B. Miller, for Radiator and assigned to the assignee of this application.

The present invention concerns an electroacoustic transducer of elliptical pipes. In particular, the invention concerns an electroacoustic transducer formed of an array of elliptical pipes secured to a support so that their major diameters are coplanar and the one-half of each of the pipes to one side of the major-diameter-plane and closest to said support are acoustically shielded. The transducer has a directivity pattern approximating that of a plane piston when measured in a plane perpendicular to the major diameters of the elliptical pipes with the acoustic axis in the direction of the minor diameters of the pipes. The pipes are preferably formed of an electromechanically responsive titanate-type ceramic material such as barium titanate. In its broader aspects this invention extends to devices of magnetostrictive, electrostrictive or piezoelectric material.

The elliptical pipe provides a better directivity pattern when the unit is rotated through the plane perpendicular to the axis of the pipe, since now the minor radius is less than $\lambda/2$ of the fluid in the region of resonance. (Ideally the minor radius should be less than $\lambda/8$. The elliptical pipe also has a low stiffness comparable to that of the cylindrical pipe. It should be noted that the patterns in a plane parallel to the axis of the pipe or even 45° away from the axis, are excellent. The efficiency of this design is about 25%, which is also the efficiency of the ammonium dihydrogen phosphate transducer in bars of single-crystalline form.

In brief, a plane array of elliptical pipes seems to combine the best features of an array of cylindrical pipes and a mosaic of flat plates. A mosaic of flat plates provides a good directivity pattern because it operates like a plane piston. A plane piston is defined as a device having a substantially planar surface which reciprocates and the displacement of every point in the surface is in phase, that is, the displacements are identical in amplitude and direction at every instant. The frequency response of the mosaic shows a very high Q at resonance since the stiffness of flat ceramic plates in thickness vibration is very high. Hollow cylindrical pipes have a broader band width than plates since the stiffness is much smaller; but the directivity pattern at resonance or at any frequency where the radius of the pipe is comparable with the $\lambda/2$ of the fluid, is bad when the unit is rotated through the plane perpendicular to the axis of the pipes.

An array of cylindrical pipes forming a plane piston radiator is known in the magneto-striction art. The present proposal using elliptical ceramic pipes gives a better directivity pattern near the region of radial (peripheral) resonance (peripheral meaning opposed to longitudinal) than does a piston array comprising cylindrical pipes. The device would not serve well as a depth sounder because the minor lobes of the radiation pattern cause confusion through interference, but would be useful as a broad band device, for example as an acoustical navigation aid, placed on a submarine or under the water on the hull of a surface vessel. A device of this type does not have to be stagger-tuned. It is inherently a broad band device, because the lumped stiffness of a hollow pipe is less than the stiffness of a solid bar or rod.

For the dimensions given hereinbelow, by way of example, the most pronounced peripheral resonance occurs approximately at 75 kc. p.s., while the longitudinal resonance occurs approximately at 28 kc. p.s.

An object of the invention is to provide an improved transducer.

Another object is to provide a transducer which has a directivity pattern that approximates that of a plane piston radiator.

Another object is to provide a transducer which has a directivity pattern that approximates that of a plane piston radiator, that is useful in underwater sound ranging where the objects to be located are that are spaced generally horizontally from the transducer.

Other objects and many of the attendant advantages of this invention will be readily appreciated as the same becomes better understood by reference to the following detailed description when considered in connection with the accompanying drawings wherein:

FIG. 1 is a diagrammatic view showing three elliptical barium titanate ceramic pipes placed in a plane array with their major diameters coplanar in a vertical plane, FIG. 2 is a view of a broadside array of elliptical pipes, and FIG. 3 is a view along line 3—3 of FIG. 2.

In FIG. 1 the transducer device consists of three elliptical barium titanate ceramic pipes 11, 12, 13, placed in a plane array with their major diameters 14, 15, 16, coplanar in a vertical plane. The three elliptical pipes can be supported in any suitable manner upon a support shown diagrammatically at 17.

Each tube or pipe 11, 12, 13 is provided with an inner electrode 18 and an outer electrode 19. Suitable lead wires (not shown) connect outer electrodes 19 together in parallel and connect inner electrodes 18 together in parallel.

The speaker sensitivity on a voltage basis is almost identical with that of the cylindrical tubes. The speaker sensitivity on a power basis is much the same as that of the cylindrical pipe unit. The directional pattern is considerably improved with elliptical tubes, showing some resemblance to the pattern of a plane piston.

Such an array has a directional pattern approximating that of a plane piston when measured in a plane perpendicular to the major diameters of the elliptical pipes (for example a horizontal plane), with the acoustic axis in the direction of the minor diameters of the pipes. When measured in a plane perpendicular to the longitudinal axes of the pipes, (for example a vertical plane cutting through the pipes), the directivity pattern is not so good as that for the horizontal plane, due to the corrugated-surface effect of the pipes; but it is yet an improvement on the corresponding vertical pattern of a cylindrical radiator, as seen in the fact that with the elliptical pipes the power in the minor lobes is always less than the power in the main lobe which is to be found along the acoustic axis. Although the preferred directivity pattern still occurs in the aforementioned horizontal plane, nevertheless the patterns found when the measuring plane intercepts the longitudinal axis of the elliptical pipes at a 45° angle, while keeping the acoustic axis parallel to the measuring plane, are much improved over the corresponding patterns for cylindrical radiators.

This device is useful in underwater sound ranging where the objects to be located are in a plane parallel to the surface of the water. When the transducer is disposed so that the plane perpendicular to the major diameters of the pipes is horizontal, then the minor lobes point obliquely toward the surface and toward the bottom and therefore are unimportant, because these lobes tend to be weaker than the main horizontal lobe and because objects to be located usually are considerably closer than the intersection of these oblique lobes with the surface or bottom.

In FIG. 2 there is seen a broadside array made up of three elliptical pipes 21 each of which may be of the order of one inch wide along the major diameter and three inches long. The bottom half of each pipe is covered with acoustic isolator material 22 so that radiation occurs only from the top half of the pipe. A suitable acoustic isolator material 22 is rubber with non-connected air cells that is sold under the trade-mark Cell-tite; Cell-tite is conventionally known and used as an acoustic isolator. Pipes 21 are mounted upon supporting plate 23 in any desired manner. For example pipes 21 can be cemented to supporting plate 23. Supporting plate 23 is mounted in a housing 24 having a cover 25 comprising an acoustic window.

The broadside array is such that each tube 21 has a major outer diameter of about one inch, a minor outer diameter of about ⅝ inch, a wall thickness of about ⅛ inch, and a length of about 3½ inches. The major and minor diameters are the same for each individual pipe. The pipes have the same length and thicknesses and are equally spaced with parallel axes.

The number three in connection with the elliptical pipes is not critical, although a plurality of pipes should be used in a broad side array to obtain the desired advantageously sharp main lobe in the directivity pattern. As compared with the similar array of circular pipes, the elliptical section gives smaller side lobes for a given resonant frequency. The size of each pipe is determined by the desired resonant frequency in the peripheral or "hoop" made of vibration. Increasing the number of tubular units in the array gives greater directivity and greater power-handling capacity. The design using three pipes was chosen to get the desired total radiating area, and in this case about 12 square inches.

The ratio of the major to the minor diameters is not critical. If the individual pipes are too flat, that is, have too high a ratio, the bandwidth is too narrow; if they are not flat enough, that is, approach a ratio of 1:1, the directivity pattern becomes poor. Recommended broad limits for the ratio of diameters is between 1.5:1 and 3.0:1.

The pipes are connected electrically with the outer electrodes 19 interconnected in parallel. They are spaced quite closely together although this spacing is not critical. The supporting structure may take forms other than shown on the drawing. In a preferred form the parts are cemented together in the position shown in FIG. 3.

Obviously many modifications and variations of the present invention are possible in the light of the above teachings. It is therefore to be understood that within the scope of the appended claims the invention may be practiced otherwise than as specifically described.

I claim:

1. An electromechanical device for transducing between acoustic and electric energy, comprsing: an array containing a plurality of generally elliptical pipes of electromechanically responsive material, each of said pipes having an axial plane coinciding with the cross-sectional major diameters therealong, said axial planes of all of said pipes being disposed in substantially coplanar fashion in the plane of the array; means for supporting said array for translation of acoustic energy, propagating in a fluid medium in directions generally normal to said plane of the array, between said array and said medium; and means associated with each of said pipes for translating the electric energy appearing in said material during said transducing.

2. A transducing device as defined in claim 1 in which said coplanar elliptical pipes are disposed in side-by-side relationship in said array.

3. An electromechanical device for transducing between acoustic and electric energy, comprising: an array containing a plurality of generally elliptical pipes of electromechanically responsive dielectric material, each of said pipes having an axial plane coinciding with the cross-sectional major diameters therealong, said axial planes of all of said pipes being disposed in substantially coplanar fashion in the plane of the array; means for supporting said array for translation of acoustic energy, propagating in a fluid medium in directions generally normal to said plane of the array, between said array and said medium; and electrode and lead means associated with each of said pipes for translating the electric energy appearing in said dielectric material during said transducing.

4. A transducing device as defined in claim 3 in which said coplanar elliptical pipes are disposed in side-by-side relationship in said array.

5. An electromechanical device for transducing between acoustic and electric energy as defined in claim 2 wherein the ratio of major diameter to minor diameter of said pipes is in the range of 1.5–1 to 3.0–1.

6. An electromechanical device for transducing betwee acoustic and electric energy as defined in claim 5 wherein the outside of the halves of said pipes to one side the plane common to the major diameters of said pipes are covered with acoustic isolator material.

7. An electromechanical device for transducing between acoustic and electric energy, comprising: a plurality of substantially identical elliptical pipes of electromechanically responsive material, means supporting said pipes side-by-side, in parallel, and equally spaced whereby the major diameters thereof are in a common plane, electrodes connected to the inside and outside of said pipes, said inner electrodes connected in common and said outer electrodes connected in common, and acoustic isolator means covering the outside of the halves of said pipes that are to one side of the common plane.

References Cited in the file of this patent

UNITED STATES PATENTS

| 2,063,949 | Pierce | Dec. 15, 1936 |
| 2,614,143 | Williams | Oct. 14, 1952 |